(12) United States Patent
Wolff et al.

(10) Patent No.: US 6,781,127 B1
(45) Date of Patent: Aug. 24, 2004

(54) COMMON APERTURE FUSED REFLECTIVE/THERMAL EMITTED SENSOR AND SYSTEM

(75) Inventors: Lawrence B. Wolff, New York, NY (US); Marvin Hutt, Oakland, NJ (US)

(73) Assignee: Equinox Corporation, New York, NY (US)

( * ) Notice: Subject to any disclaimer, the term of this patent is extended or adjusted under 35 U.S.C. 154(b) by 218 days.

(21) Appl. No.: 09/876,152

(22) Filed: Jun. 8, 2001

Related U.S. Application Data
(60) Provisional application No. 60/210,010, filed on Jun. 8, 2000.

(51) Int. Cl.[7] .............................................. H01L 25/00
(52) U.S. Cl. ...................................... 250/332; 250/330
(58) Field of Search ................................ 250/332, 330, 250/338.1, 316.1, 339.05, 339.02, 339.01

(56) References Cited

U.S. PATENT DOCUMENTS

| | | |
|---|---|---|
| 5,781,336 A | 7/1998 | Coon et al. |
| 5,808,350 A | 9/1998 | Jack et al. |
| 6,020,994 A | 2/2000 | Cook |
| 6,208,459 B1 | 3/2001 | Coon et al. |
| 6,222,187 B1 * | 4/2001 | Shivanandan ............... 250/330 |

OTHER PUBLICATIONS

Horn, S.; Campbell, J.; Driggers, R.; Soyka, T.; Norton, P.; Perconti, P.; Fused Reflected/Emitted Light Sensors; Proceedings of SPIE, vol. 4369 (2001).
Anderson, J.; Kostrzewa, L.; Cook, L.; Baker, G.; Integrated Imaging Sensors; Proceedings of SPIE vol. 4369 (2001).
Zhou, Y.T.; Multi-Sensor Image Fusion; IEEE 1994.
Toet, A.; Multiscale Contrast Enhancement with Applications to Image Fusion; Optical Engineering, May 1992; vol. 31 No. 5.
Toet, A.; Walraven, J.; New False Color Mapping for Image Fusion; Optical Engineering 35(3), pps. 650–658, Mar. 1996.
Waxman, A.; Gove, A.; Fay, D.; Racamato, J.; Carrick, J.; Seibert, M.; Savoye, E.; Color Night Vision: Opponent Processing in the Fusion of Visible and IR Imagery; Neural Networks Letter; Mar. 1996.
Toet, A.; Ruyven, L.; Valeton, J.; Merging Thermal and Visual Images by a Contrast Pyramid; Optical Engineering, Jul. 1989, vol. 28, No. 7.
Scribner, D.; Warren, P.; Schuler, J.; Satyshur, M.; Kruer, M.; Infrared Color Vision: An Approach to Sensor Fusion; Optics & Photonics News; Aug. 1998.
Li, H.; Manjunath, B.S.; Mitra, S.; Multi-Sensor Image Fusion Using The Wavelet Transform; IEEE 1994.

* cited by examiner

*Primary Examiner*—David Porta
*Assistant Examiner*—Christine Sung
(74) *Attorney, Agent, or Firm*—Jones, Tullar & Cooper PC

(57) ABSTRACT

A sensor fusion system simultaneously acquires at least two images in a subspectrum of the visible/NIR/SWIR (0.4–2.0 micron) reflective spectrum and in a subspectrum of the thermal infrared (3.0–15 micron) spectral regions using respective sensing arrays viewing a common aperture. Although sensed by separate focal plane arrays, radiation enters at the front-end of a commonly shared focusing optical system so that all sensed radiation originates along exactly the same optical path and then is directed to each sensing plane. This provides precise co-registration of reflective and thermal infrared imagery regardless of the depth-of-field range of the scene being imaged, and enables the precise integration of image fusion processing and algorithms to fully exploit the complementary properties of reflected and thermally emitted radiation from a scene.

19 Claims, 5 Drawing Sheets

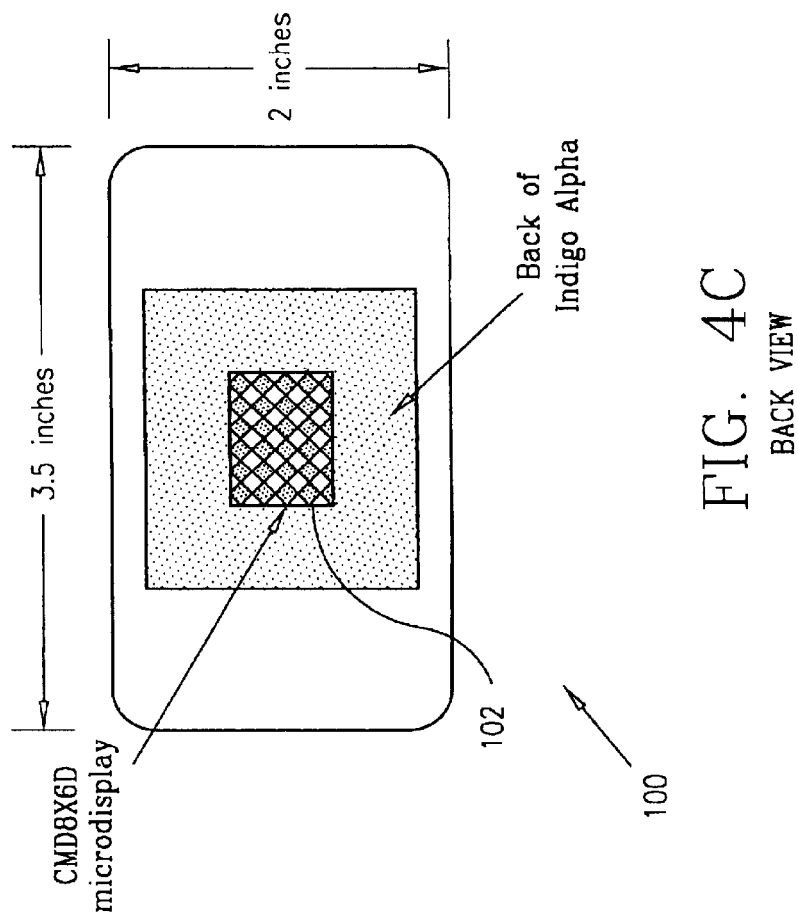
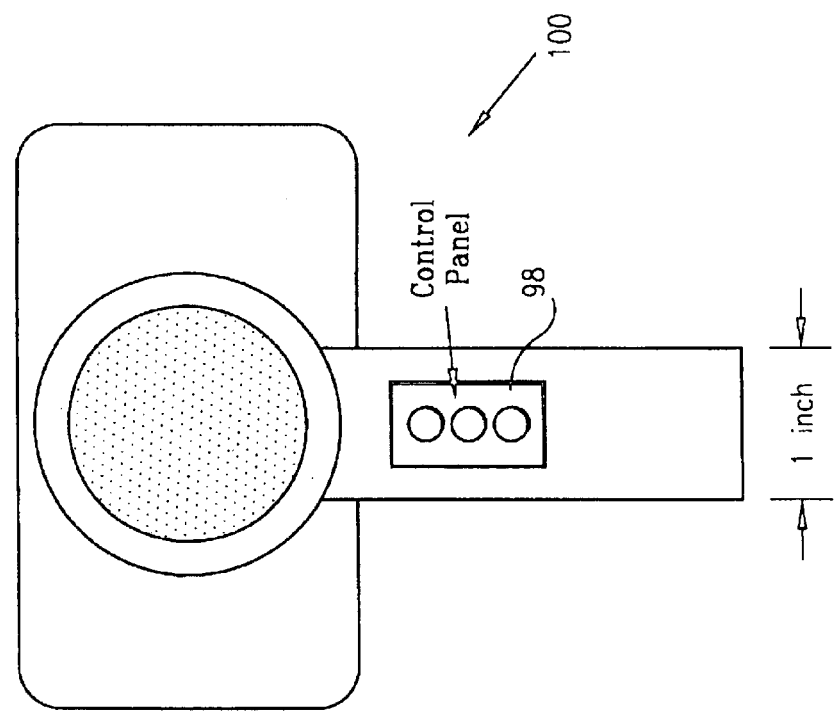
FIG. 4B
FRONT VIEW
FIG. 4C
BACK VIEW

COMMON APERTURE FUSED REFLECTIVE/THERMAL EMITTED SENSOR AND SYSTEM

This application claims the benefit of U.S. Provisional Application No. 60/210,010, filed Jun. 8, 2000, the disclosure of which is hereby incorporated herein by reference.

STATEMENT REGARDING FEDERALLY SPONSORED RESEARCH OF DEVELOPMENT

This invention was made with Government support under DAAH01-99-C-R114 awarded by the U.S. Army Aviation and Missile Command. The Government has certain rights in this invention.

FIELD OF THE INVENTION

This invention relates to an integrated system comprising simultaneous co-registered sensing of thermally emitted radiation and sensing of reflected radiation in the visible/NIR/SWIR from the same view and fusing these sensing modalities to provide important visual information to an observer, or to an automated image processing system for interpreting the scene.

BACKGROUND OF THE INVENTION

For the most part, electromagnetic radiation sensed in an outdoor or indoor scene in the visible, near infrared (NIR) and shortwave infrared (SWIR) spectrums results from reflection, while radiation sensed at wavelengths from 3–15 microns mostly results from thermal emission. There are a number of exceptions, such as visible emission from the sun and the presence of significant reflection in the 3–5 micron midwave infrared (MWIR) spectrum, but the complementarity of reflection and thermal emission is generally acknowledged with respect to the visible/NIR/SWIR and wavelengths above 3 microns.

The advantages of having sensing capability for both reflected radiation and thermal emission has been noted in some recent patents. In U.S. Pat. No. 5,534,696 a sight apparatus is designed so that a viewer can better observe thermal IR imagery in the context of a direct visible view of a scene. In U.S. Pat. No. 6,020,994 an integrated apparatus includes the capability of an observer to switch between direct visible view and thermal IR for wide and narrow fields of view. In U.S. Pat. No. 5,944,653 visible and thermal IR views are boresighted within an endoscopic system. U.S. Pat. No. 5,808,350 teaches a design for integrating IR, visible and NIR sensing in the same focal plane array.

A number of computational algorithms for image fusion have already been developed for visible and thermal IR imagery. See for example:

(1) L.~van~Ruyven A.~Toet and J.~Valeton. Merging thermal and visual images by a contrast pyramid. Optical Engineering, 28(7):789–792, 1989.

(2) D.~Fay J. Racamato J. Carrick M.~Seibert A.~Waxman, A.~Gove and E.~Savoye. Color night vision: Opponent processing in the fusion of visible and {R} imagery. Neural Networks}, 10(1):1–6, 1997.

(3) P.~Burt and R.~Lolczynski. Enhanced image capture through fusion. Proceedings of IEEE 4th International Conference on Computer Vision, volume~4, pages 173–182, 1993.

(4) J.~Schuler M.~Satyshur D.~Scribner, P.~Warren and M.~Kruer. Infrared color vision: An approach to sensor fusion. Optics and Photonics News, August 1998.

(5) B.~S.~Manjunath H.~Lui and S.~K. Mitra. Multi-sensor image fusion using the wavelet transform. Proceedings IEEE International Conference on Image Processing, pages 51–55, 1994.

(6) D.~Socolinsky and L.~B. Wolff. Visualizing local contrast for multispectral imagery. Pending U.S. patent application, 1998.

(7) D.~A. Socolinsky and L.~B. Wolff. Optimal grayscale visualization of local contrast in multispectral imagery. Proceedings: DARPA Image Understanding Workshop, pages 761–766, Monterey, November 1998.

(8) D.~A. Socolinsky and L.~B. Wolff. A new paradigm for multispectral image visualization and data fusion. Proceedings:CVPR '99}, Fort Collins, June 1999.

(9) A.~Toet. Hierarchical image fusion. Machine Vision and Applications, pages 1–11, March 1990.

(10) A.~Toet. New false color mapping for image fusion. Optical Engineering}, 35(3):650–658, 1996.

(11) H. A. MacLeod, "Thin Film optical filters", Institute of Physics Publishers, $3^{rd}$ edition, March 2001

References (2), (4) and (10) have proposed psychophysically motivated image fusion including the use of neural network approaches. References (3) and (5) develop wavelet image fusion methods. References (1) and (9) develop hierarchical image fusion algorithms. References (6), (7) and (8) develop image fusion algorithms that combine first-order contrast.

SUMMARY OF THE INVENTION

The imaging modalities of visible/NIR/SWIR and of thermal IR reveal complementary physical information with respect to one another for most typical scenes; visible/NIR/SWIR imagery senses reflected light radiation while thermal IR imagery senses mostly thermally emitted radiation, Fusing these imaging modalities using optics, sensor hardware and image processing algorithms can provide large advantages for human visual enhancement and automated image understanding.

This invention relates to a sensor system design that integrates optics, sensing hardware and computational processing to achieve optimum utilization of complementary information provided by the fusion of visible/NIR/SWIR and thermal IR imagery. This is accomplished through accurate co-registration of these respective modalities and then either optimum presentation/visualization to an observer or output of accurately co-registered information to an automated image understanding system. In the absence of a monolithic device that can simultaneously sense visible/NIR/SWIR and thermal IR at a pixel, two separate sensing arrays must be brought into exact alignment such that corresponding pixels view exactly the same scene element. Previous inventions, although sometimes citing common optical systems, do not achieve nor emphasize the importance of accurate co-registration for reflective and thermal emission.

Boresighted sensing attempts to image the same scene with two different imaging modalities placed side-by-side. Although both sensors are close in proximity, the view orientation and magnification respective to both sensors being slightly different makes co-registration dependent upon external 3-D depth of scene elements, which is almost always unknown and changes from scene-to-scene. Single window systems suffer the same co-registration problems as they require separate focusing optics for respective focal plane sensing arrays. Apart from ever present differences in magnification and distortion, separate focusing optics always creates a small stereo baseline between focal plane arrays which means that co-registration will not 'track' with depth in a scene.

The accurate co-registration between a subspectrum of visible/NIR/SWIR and a subspectrum of thermal IR for the first time enables the application of computational fusion algorithms such as those described by References 1–10 listed above, which produce composite visualizations of dual reflective\thermal IR imagery. Accurate co-registration also enables automated image understanding algorithms to perform computations including optic flow, tracking, biometric recognition, automatic target recognition.

A way to achieve accurate co-registration independent of depth in a scene is, for all focusing optics, to be common to both focal plane arrays. This can be achieved by using a single objective lens at the front-end of the apparatus through which all sensed radiation is focused onto respective focal plane arrays. A dichroic beamsplitter merely directs the appropriate subspectrum of incident radiation onto the corresponding sensing array and is optically a focal.

With depth independent co-registration the co-registration mapping between both focal plane arrays is an affine linear transformation having the following form:

$$\begin{pmatrix} X_2 \\ Y_2 \\ 1 \end{pmatrix} = \begin{pmatrix} A & B & -T_x \\ C & D & -T_y \\ 0 & 0 & 1 \end{pmatrix} \begin{pmatrix} X_1 \\ Y_1 \\ 1 \end{pmatrix}$$

where image coordinates $(X_1, Y_1)$ on the $1^{st}$ image plane are mapped to image coordinates $(X_2, Y_2)$ on the $2^{nd}$ image plane. The parameters $T_x$ and $T_y$ are respectively translation in x and y, while the upper left 2×2 submatrix can be decomposed as the product of a rotation by angle $\theta$ and magnifications $S_x$ and $S_y$ in x and y respectively, according to:

$$\begin{pmatrix} A & B \\ C & D \end{pmatrix} = \begin{pmatrix} \cos\theta & -\sin\theta \\ \sin\theta & \cos\theta \end{pmatrix} \begin{pmatrix} S_x & 0 \\ 0 & S_y \end{pmatrix}$$

The scaling parameters account for differences in physical horizontal and vertical pixel size between the two focal plane arrays, and, rotation and translation parameters account for corresponding relative rotation and translation of the two focal plane arrays with respect to one another.

One of the major stumbling blocks for current face recognition technology based on visible imagery is that intra-personal variations due to changes in ambient illumination between acquisition of the training set and the probe image is often larger than inter-personal variation. This makes recognition and identification systems very sensitive to change in imaging conditions and restricts their applicability. The illumination invariance property of thermal IR (especially LWIR imagery) is a promising alternative to solve this problem. However, visible imagery enjoys more highly textured detail that may be valuable for recognition. Additionally, glass is opaque to longwave infrared and therefore any person wearing eyeglasses will have a significant portion of their face obscured to a thermal sensor. Furthermore, while thermal imagery is invariant to illumination, it is not invariant to the activity level of the subject. For example, someone being imaged outside on a cold day will have colder cheeks, nose and ears than if imaged indoors. Either of these modalities alone suffers from shortcomings which limit its applicability in an unconstrained face recognition scenario. However, the strengths of one modality complement the weaknesses of the other, and vice-versa, thus making the cooperative sensor fusion of visible/NIR/SWIR and thermal IR in the present invention a powerful technology for increasing the performance of face recognition and perhaps other biometric recognition methods for detection and recognition of humans from portions of the body either external or internal. For instance, perfectly co-registered visible/thermal IR endoscopic imagery can significantly improve upon the invention in U.S. Pat. No. 5,944,653.

The complementarity of reflective versus thermal phenomenology give the present invention some unique capabilities for surveillance and monitoring, and tracking. Being able to separate moving objects from their shadows means that we can segment the true shape of the object, without confounders, and use that shape for classification and identification. The fact that most objects of interest in a surveillance situation are warmer than their background (humans, cars) means there is less confusion arising from spurious moving objects such as tree branches swaying in the wind. On the other hand, a parked vehicle which is suddenly started and begins moving may be more easily detectable in the visible spectrum, since its temperature is similar to the ambient temperature (depending on several factors). Additionally, once a moving target has been identified and segmented, it may be desirable for a human operator to verify the nature of the object, for example the identity of a pedestrian. In this case, visible imagery is superior since humans are well adapted to that modality.

BRIEF DESCRIPTION OF DRAWINGS

The foregoing, and additional objects, features and advantages of the present invention will be apparent to those of skill in the art from the following detailed description of preferred embodiments, taken with the accompanying drawings in which:

FIGS. 4A–4C illustrate an assembly for a compact hand-held night vision system which displays fusion of intensified visible/NIR and thermal IR to the user and has a control panel allowing the user to modify visualization of this image fusion.

DETAILED DESCRIPTION OF THE INVENTION

The present invention relates to the design and packaging of elements to provide a compact, fully integrated, multifunctional sensor fusion system that accurately co-registers reflective imagery in a subspectrum of the visible/NIR/SWIR spectrum with co-registered imagery in a subspectrum of the thermal infrared spectrum (3–15 microns).

Figure 1:
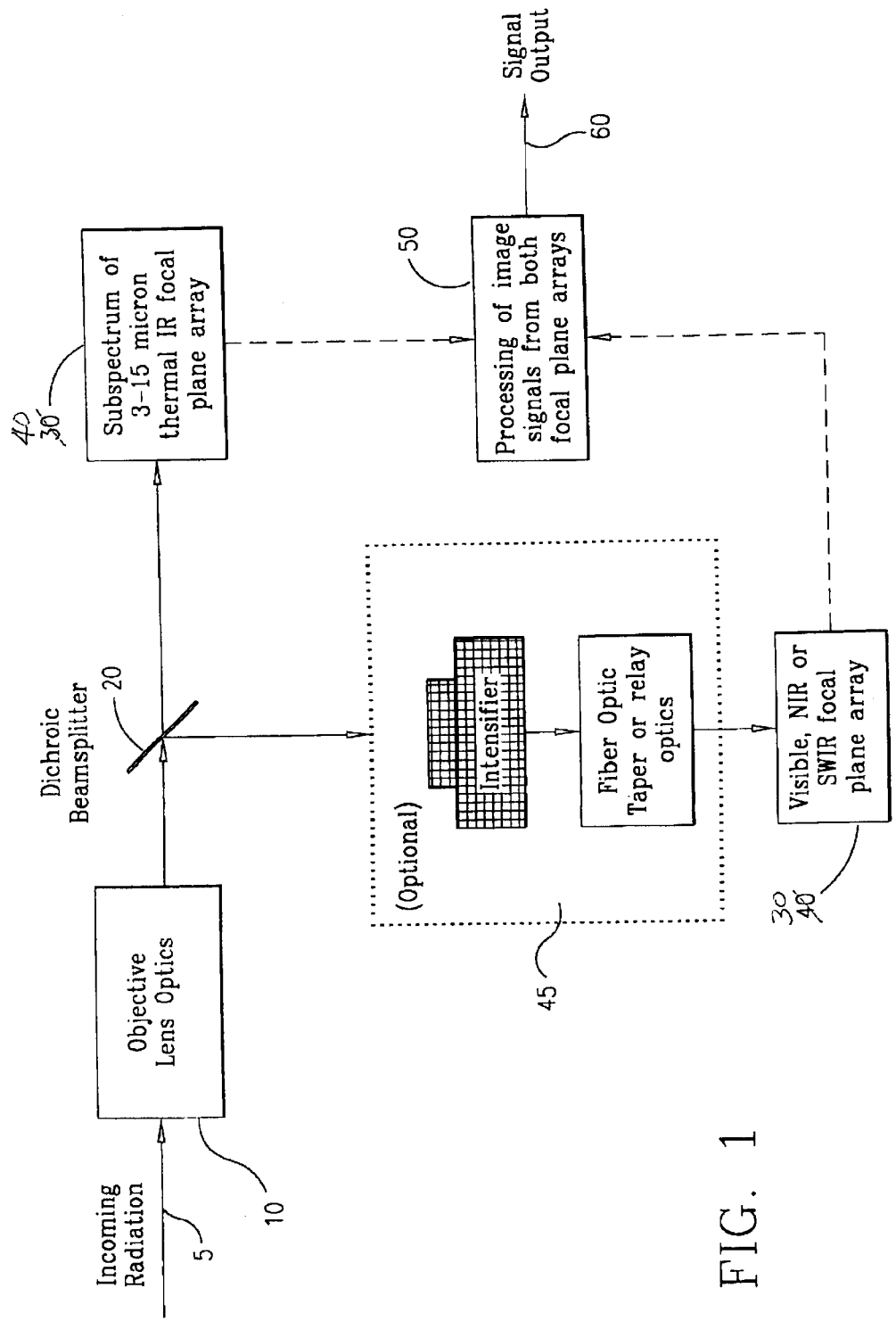
FIG. 1 is a diagrammatic illustration of the primary optical, sensor hardware, and computational processing components that are integrated into the system of the invention.

An embodiment of the present invention is shown as a block diagram in FIG. 1, depicting a compact, fully integrated assembly for a dual reflected/thermal emitted sensor system. Light/IR radiation 5 that is sensed by the system must first pass through the same objective lens focusing system 10. The radiation focused through the front end of the objective lens is then split by a dichroic beamsplitter 20 such that thermal infrared radiation is transmitted to a thermal IR sensing focal plane array 30 and visible/NIR/SWIR radiation is reflected to a corresponding sensing focal plane array 40. The dichroic beamsplitter 20 consists of an optical coating (e.g., an interference coating such as described in the book by MacLeod, Reference 11 above) deposited on a material substrate. The optical coating is designed to optimize the amount of beamsplitter reflection/transmission respective to the corresponding desired spectrums of radiation to be imaged and then fused. For instance, if it is desired to fuse imagery produced from radiation in the 0.4–0.9 micron region with imagery produced from radiation in the 8–14 micron region, then an optical coating in combination with the material substrate must be designed to maximize reflection of 0.4–0.9 micron radiation while maximizing transmission of 8–14 micron radiation. While in FIG. 1 the thermal IR radiation is depicted to be transmitted through the dichroic beamsplitter 20 with the visible/NIR/SWIR radiation reflected, it may be that in some instances it is more optimal to reflect thermal IR while transmitting visible/NIR/SWIR with respect to the beamsplitter.

Incoming radiation is optically focused onto each of the focal plane arrays 30 and 40 by the same optical elements of the objective lens 10. The dichroic beamsplitter 20 is only used to separate and direct the desired subspectrums of radiation to the corresponding focal plane arrays. The ability of an objective lens 10 to simultaneously focus a subspectrum of visible/NIR/SWIR and a subspectrum of thermal IR requires a special design of optical elements that maintain a super-achromatic condition across these respective spectrums. For instance U.S. Pat. Nos. 5,781,336 and 6,208,459 by Coon et al. teach the art of using MgO and CaF2 optical elements to design a lens system maintaining a super-achromatic condition from 0.4–5.9 microns. It is possible to design objective lens systems using other types of materials which maintain a super-achromatic condition from the visible spectrum all the way through the longwave infrared. The fact that radiation is being focused on both focal plane arrays by the exact same set of optical elements 10 maintains a true common aperture condition, whereby elements of a scene, represented by radiation 5, can be simultaneously coregistered on both focal plane arrays 30 and 40 regardless of 3-D depth. Addition of focusing optical elements aft to the dichroic beamsplitter separate to each of the focal plane arrays creates a stereo baseline making coregistration dependent upon 3-D depth in a scene.

There are a number of sensing technologies that can be used for the focal plane arrays 30 and 40. For array 30 in a subspectrum of the visible/ NIR/SWIR spectrum, common in video cameras is the use of Charge Coupled Device (CCD) technology which generally operates in the spectral range 0.4–1.1 micron. Becoming more mature is low power CMOS technology. Also available in the 0.4–1.1 micron sensing range is Charge Injection Device (CID) technology with non-destructive readout and operability in radiation hard environments. Indium Gallium Arsenide (InGaAs) sensing arrays are efficient in the 1.0–2.0 micron region. It is also possible to fabricate Mercury Cadmium Telluride (HgCaTe) arrays to be optimally sensitive in subspectrums of the 0.4–2.0 micron spectrum. For array 40 in a subspectrum of the thermal IR, Indium Antimonide (InSb) is highly efficient for imaging in the midwave thermal-IR region 3–5 microns, while Mercury Cadmium Telluride (HgCaTe) can be used both for midwave thermal infrared and in the longwave thermal infrared (8–15 microns) spectral region. Both InSb and HgCaTe need to be significantly cooled for sufficient sensitivity. Emerging are the increasingly cost-effective uncooled microbolometer (made primarily by Boeing, Lockheed-Martin and Raytheon) and ferroelectric/pyroelectric sensing arrays (made by Raytheon) that are sensitive in the longwave thermal IR 7–14 microns.

Particularly for visible light and NIR spectrums, it can be advantageous to use intensifier tube technology to amplify low light levels at night. In FIG. 1, an optional component 45 consisting of an intensifier tube, such as made by ITT or Litton, coupled to the visible/NIR focal plane array 30 by either a fiber optic taper or relay lens optics is illustrated. Intensified visible/NIR fused with thermal IR imagery can provide a powerful design for night vision goggles, rifle sight or driver vision enhancement which simultaneously exploit low-level reflected light and thermal emission.

Figure 2A:
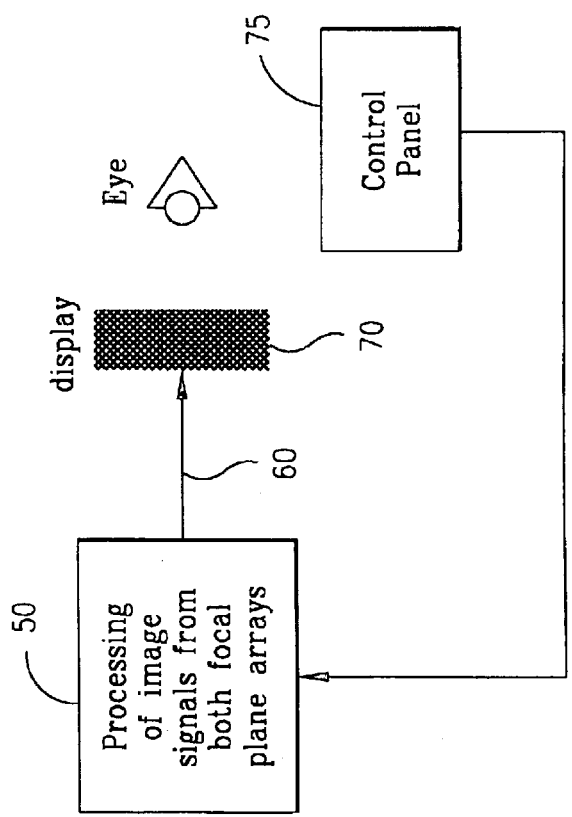
FIG. 2a is a diagrammatic illustration of an output signal from the system of FIG. 1 going to a display device that presents a fused visualization of the signals from both focal plane arrays to an observer, including control panel which enables the user to interact with the computational processing hardware to achieve different types of visualizations.

Radiation sensed by focal plane arrays 30 and 40 is converted into corresponding electronic signals which are then combined or fused by signal or computational processing 50 to produce an output signal 60. For a configuration such as in FIG. 2a, where the signal output 60 goes to a display device 70, this processing can implement any number of fusion techniques including those described by references 1–10 listed above. The electronic signals produced from each of the focal plane arrays can be analog (e.g., RS-170) or digital (e.g., RS-422, LVDS, Camera Link). In the case of analog electronic outputs from the focal plane arrays there is the option to use analog VLSI computational processing, which is known to be very fast. Alternatively, a miniaturized analog circuit board can be used. The computational processing could also include analog/digital conversion and then subsequent digital processing that performs image fusion. A specific example of this might be a miniaturized Single Board Computer (SBC) which has slots for analog/digital boards and sufficient computational power for implementing real-time image fusion algorithms. In the case of digital electronic output from the focal plane arrays Digital Signal Processing (DSP) chips can be used as well as SBCs to perform image fusion. One example of an image fusion chip for visible/thermal IR imagery is the wavelet fusion chip on the Acadia board made by Sarnoff Corporation, performing variations on wavelet algorithms by Burt et al, Reference (3). In FIG. 2a there is the additional provision for a control panel 75, whereby a user can manipulate switches, buttons or keys which send signals to the computational processing unit 50 to modify the parameters of a computational image fusion visualization algorithm, or even the computational visualization algorithm itself. For example, the modification could be as simple as controlling the relative amount of overlay of visible imagery in green and thermal IR imagery in red. The user may want to increase the sensitivity of gradations of thermal IR either in brightness or by using different color hues when overlayed on visible imagery. When applying a wavelet-based image fusion algorithm, the user may want to vary/restrict the frequency range of the two respective imagery modalities. Or the user may want to switch between multiple image fusion algorithms altogether such as from an opponent-based fusion algorithm such as taught by Reference (2) to a wavelet based algorithm such as taught by Reference (5). It should be noted that the computational processing 50 of signal outputs from the two focal plane arrays also implements the corresponding scaling, rotation and translation parameters $T_x$, $T_y$, $\theta$ and $S_x$ and $S_y$ in the affine linear transformation defined above.

Figure 2B:
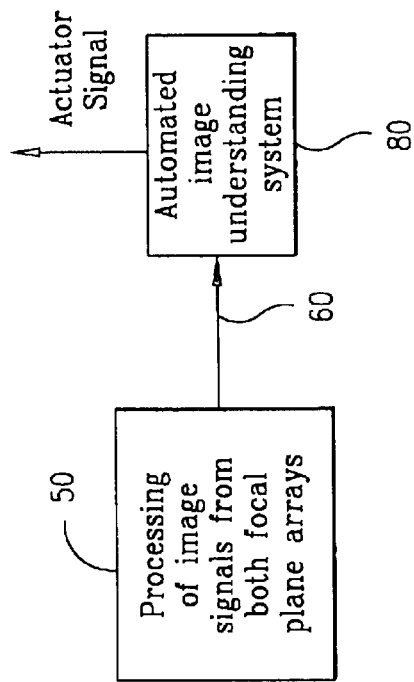
FIG. 2b is a diagrammatic illustration of an output signal from the system of FIG. 1 going to an automated image understanding system that then is capable of actuating a decision based upon information received from the integrated sensor system.

FIG. 2*b* shows the case where the output signal 60 is passed to an automated image understanding system 80 that actuates a decision based upon information it receives from the integrated sensor system in FIG. 1. Precisely co-registered images from a subspectrum of the visible/NIR/SWIR and a subspectrum of the thermal IR enables the practical application of image understanding methods using these dual modalities that can significantly improve upon the performance of using just a single one of these modalities alone. Image understanding applications include face recognition, automatic target recognition, surveillance and tracking. An automated image understanding system may recognize an individual and actuate an alarm should it be someone wanted by law enforcement. The system may detect a human and actuate an intruder alert. Or such a system can interactively regulate the trajectory of a missile on course to a desired target. The computational processing 50 may preprocess the dual image information before becoming output signal 60 such as performing certain types of image compression or image segmentation. It is possible for the computational processing 50 unit to interact intelligently with the automated image understanding system to extract optimal information from the scene.

Figure 3:
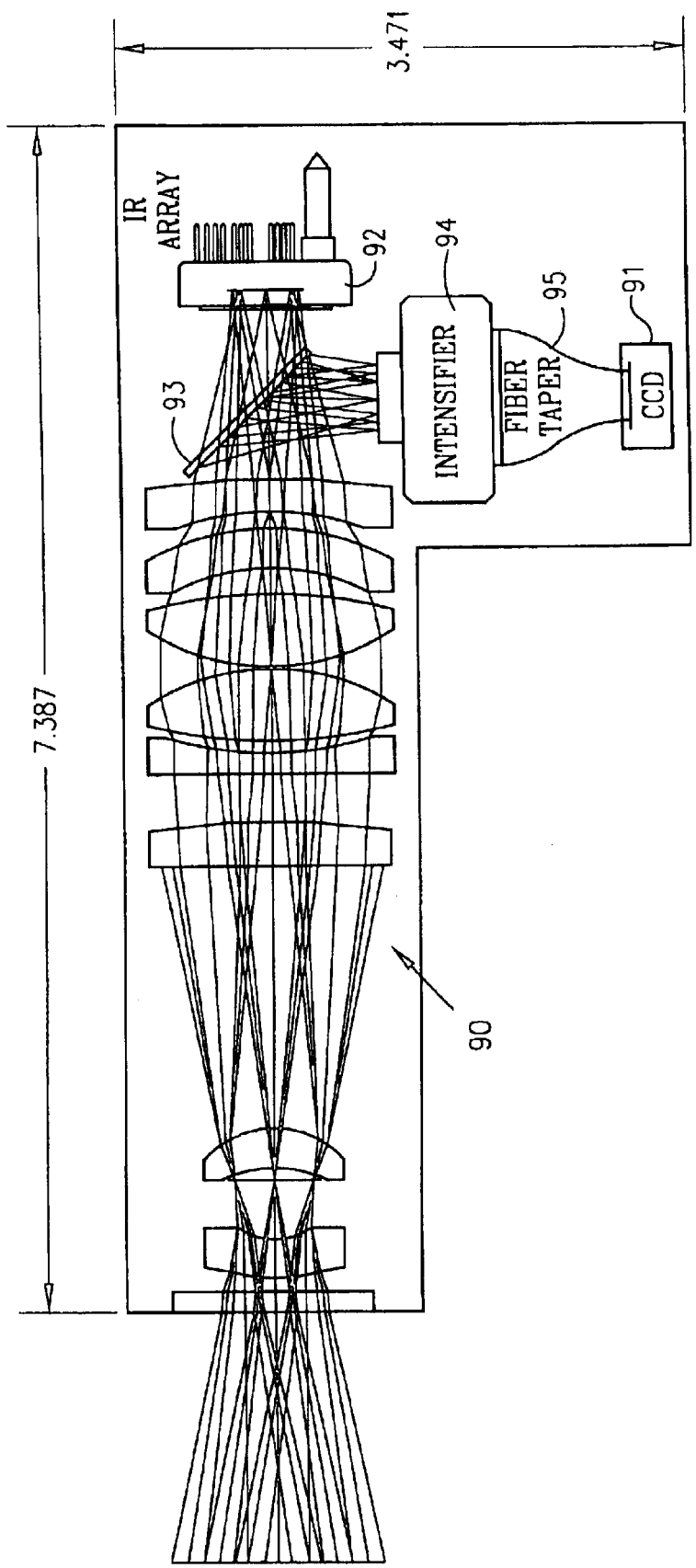
FIG. 3 is a schematic diagram of a preferred embodiment of an integrated, dual low-light level visible /NIR and LWIR sensing system.

FIG. 3 shows a preferred embodiment for a portion of the block diagram shown in FIG. 1. In this case, the visible/NIR/SWIR sensing array 91 is a CCD chip that senses radiation efficiently from 0.4–1.1 micron, and the thermal IR sensing focal plane array 92 is a 160×120 pixel Gen 5 microbolometer array sensing in approximately the 7–14 micron subspectrum, made by Boeing. The dichroic beamsplitter 93 is made from a ZnSe substrate and an optical interference coating that optimizes reflection in the 0.4–1.1 micron subspectrum, at the same time optimizing transmission in the 7–14 micron subspectrum. The objective lens 90 made from various lens elements of different materials including BaF, KBr and ZnS, is made to be super-achromatic between 0.4 and 14 microns. A ITT Model F9910C ultraimage intensifier Gen III tube 94 is optically coupled to the CCD focal plane array by a fiber optic taper 95 made by Schott.

Figure 4A:
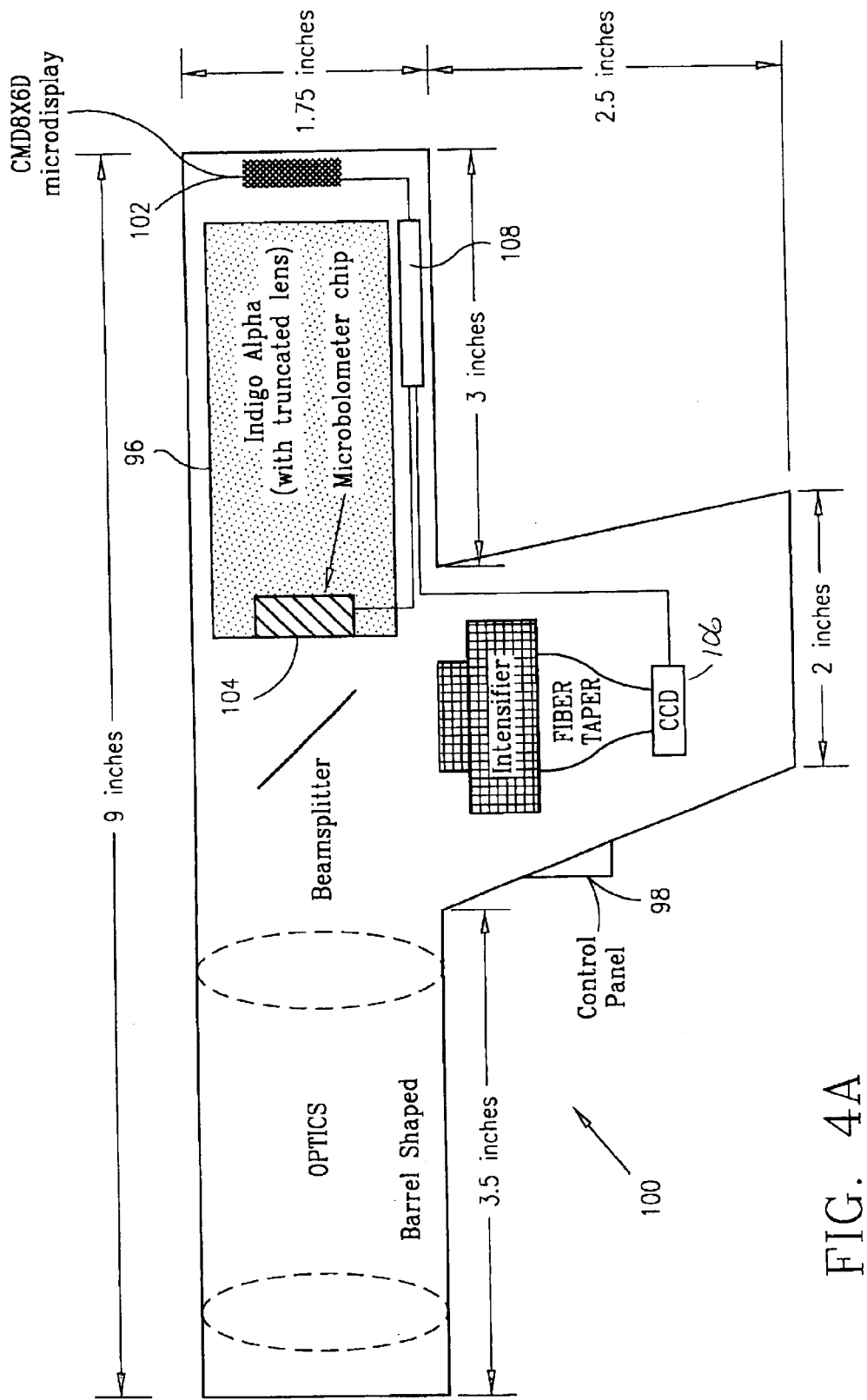

FIGS. 4A–4C show an assembly 100 for a compact, hand-held night vision system which displays on the microdisplay 102 the fusion of intensified visible/NIR and thermal IR to the user and has a control panel 98 allowing the user to modify visualization of this image fusion. This uses an incorporated longwave IR 'model Alpha' camera 96 made by Indigo Systems of Santa Barbara, Calif., which uses Boeing's Gen 5 microbolometer focal plane array 104. The CCD array 106 is a Texas Instruments model TC-237. The signals from the CCD focal plane array and the microbolometer focal plane array are digitized and sent to a Ultracompact PCI based SBC carrier board 108 made by Cell Computing Inc. for computational processing. The display 102 is a Model CMD8X6D 800×600 resolution microdisplay made by Colorado MicroDisplays.

Although the invention has been described in terms of preferred embodiments, it will be understood by those of skill in the art that numerous modifications may be made without departing from the true spirit and scope thereof, as set forth in the following claims.

What is claimed is:

1. A sensor apparatus comprising:
    a single superachromatic objective lens for focusing on a focal plane radiation in a subspectrum of the visible/NIR/SWIR reflective spectral region and in a subspectrum of the thermal IR 3–15 micron emissive spectral region from a scene;
    a beam splitter for receiving radiation from said objective lens and dividing the received radiation into first and second components;
    a first focal plane array receiving said first component of said radiation and sensing in a subspectrum of the visible/NIR/SWIR spectral region to produce a corresponding first output signal;
    a second focal plane array receiving said second component of said radiation and sensing in a subspectrum of the thermal IR 3–15 micron spectral region to produce a second output signal; and
    a composite signal output derived from the signal outputs of said first and second focal plane arrays.

2. A sensor apparatus as described in claim 1 further including an intensifier optically coupled to said first focal plane array sensing in a subspectrum of the visible/NIR/SWIR spectral regions.

3. A sensor apparatus as described in claim 2, further including a display device, and wherein said composite signal output is connected to a said display device.

4. A sensor apparatus as described in claim 3, further including a processor coupled to said first and second focal plane arrays for deriving said composite signal and for connecting said composite signal to said display device, and a control panel connected to said processor for manipulating the processing of signal outputs from the two focal plane arrays to produce a desired displayed visualization.

5. A sensor apparatus as described in claim 4 which is assembled into a compact hand-held device.

6. A sensor apparatus as described in claim 1, further including a processor coupled to said first and second focal plane arrays for deriving a composite output signal from said first and second output signals.

7. A sensor apparatus as described in claim 6, wherein said processor includes means to perform image fusion to produce said composite output signal.

8. A sensor apparatus as described in claim 7, further including an automated image understanding system for scene recognition.

9. A sensor apparatus as described in claim 8, wherein said image understanding system produces an output signal based on scene recognition.

10. A sensor apparatus as described in claim 1, wherein said first focal plane array is a CCD chip capable of sensing radiation in about the 0.4–1.1 micron spectral range and said second focal plane array is a microbolometer array capable of sensing in about the 7–14 micron spectral range.

11. A sensor apparatus as described in claim 1, wherein said objective lens is a multielemment lens that is superachromatic for radiation in the 0.4 and 14 micron spectral range.

12. A sensor apparatus as described in claim 1, further including a display for receiving said composite signal output.

13. A sensor apparatus as described in claim 1, wherein said beam splitter includes means for maximizing reflection of 0.4–0.9 micron radiation while maximizing transmission of 8–14 micron radiation.

14. A sensor apparatus as described in claim 1, wherein said beam splitter includes means for maximizing transmission of 0.4–0.9 micron radiation while maximizing reflection of 8–14 micron radiation.

15. A sensor apparatus as described in claim 1, wherein said objective lens is a multielement achromatic lens using the same optical elements to simultaneously focus said subspectrum of visible/NIR/SWIR radiation and said subspectrum of thermal IR on said focal plane, whereby elements of a scene are simultaneously registered on both said first and said second focal arrays, independent of scene depth.

16. A sensor apparatus as described in claim 15, wherein said first and second focal plane arrays convert received radiation to corresponding first and second electronic signals, said sensor further including a processor for fusing said first and second electronic signals to produce a composite output signal, and a controller for regulating said processor to modify said composite signal output; and means responsive to said composite signal output for producing a display.

17. A sensor apparatus as described in claim 16, wherein said means responsive to said composite signal is a display device for providing an image of said scene.

18. A sensor apparatus as described in claim 16, wherein said means responsive to said composite signal is an automated image understanding system.

19. A sensor apparatus as described in claim 1, further including an automated image understanding system responsive to said composite signal output for, but not limited to, target recognition, biometric recognition and tracking.

* * * * *